(12) United States Patent
May

(10) Patent No.: US 12,081,400 B2
(45) Date of Patent: Sep. 3, 2024

(54) SYSTEMS AND METHODS FOR SD-WAN SETUP AUTOMATION

(71) Applicant: Fortinet, Inc., Sunnyvale, CA (US)

(72) Inventor: Robert A. May, Burnaby (CA)

(73) Assignee: Fortinet, Inc., Sunnyvale, CA (US)

( * ) Notice: Subject to any disclaimer, the term of this patent is extended or adjusted under 35 U.S.C. 154(b) by 0 days.

(21) Appl. No.: 17/958,616

(22) Filed: Oct. 3, 2022

(65) Prior Publication Data

US 2024/0113939 A1   Apr. 4, 2024

(51) Int. Cl.
*H04L 41/08* (2022.01)
*H04L 12/28* (2006.01)
*H04L 41/0806* (2022.01)

(52) U.S. Cl.
CPC .......... *H04L 41/0886* (2013.01); *H04L 12/28* (2013.01); *H04L 41/0806* (2013.01)

(58) Field of Classification Search
CPC .. H04L 41/0886; H04L 12/28; H04L 41/0806
See application file for complete search history.

(56) References Cited

U.S. PATENT DOCUMENTS

| | | | | |
|---|---|---|---|---|
| 11,456,894 B1 * | 9/2022 | Sundararajan | ...... | H04L 12/4645 |
| 11,546,257 B1 * | 1/2023 | Gupta | ...... | H04L 45/12 |
| 11,563,601 B1 * | 1/2023 | K S | ...... | H04L 41/0816 |
| 2006/0020698 A1 * | 1/2006 | Whipple | ...... | H04L 69/40 |
| | | | | 709/224 |
| 2007/0061575 A1 * | 3/2007 | Bennett | ...... | H04L 63/0428 |
| | | | | 713/171 |
| 2007/0091861 A1 * | 4/2007 | Gupta | ...... | H04L 41/00 |
| | | | | 370/338 |
| 2016/0218947 A1 * | 7/2016 | Hughes | ...... | H04J 11/00 |
| 2018/0032372 A1 * | 2/2018 | Devendran | ...... | G06F 9/5077 |
| 2019/0207844 A1 * | 7/2019 | Kodavanty | ...... | H04L 45/02 |
| 2021/0281576 A1 | 9/2021 | Sharavan | | |
| 2021/0377109 A1 * | 12/2021 | Shrivastava | ...... | H04L 45/34 |
| 2021/0409275 A1 * | 12/2021 | Galchenko | ...... | H04L 41/0895 |
| 2022/0029988 A1 | 1/2022 | Levin | | |
| 2022/0052928 A1 * | 2/2022 | Sundararajan | ...... | H04L 41/5048 |
| 2022/0150134 A1 * | 5/2022 | Ewert | ...... | H04L 41/22 |
| 2022/0209990 A1 * | 6/2022 | Dillon | ...... | H04L 12/4641 |
| 2022/0345491 A1 | 10/2022 | Luo | | |
| 2023/0017423 A1 * | 1/2023 | Guntupalli | ...... | H04W 24/02 |
| 2023/0028872 A1 * | 1/2023 | Ramaswamy | ...... | H04L 45/566 |

OTHER PUBLICATIONS

U.S. Appl. No. 17/958,616, filed Oct. 3, 2022, Burnaby.
U.S. Appl. No. 17/980,246, filed Nov. 3, 2022, Burnaby.
U.S. Appl. No. 17/958,608, filed Oct. 27, 2022, Burnaby.

* cited by examiner

*Primary Examiner* — Michael Won
(74) *Attorney, Agent, or Firm* — Jaffery Watson Hamilton & DeSanctis LLP

(57) ABSTRACT

Various embodiments provide systems and methods for automating an SD-WAN setup process.

20 Claims, 6 Drawing Sheets

SYSTEMS AND METHODS FOR SD-WAN SETUP AUTOMATION

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright© 2021, Fortinet, Inc.

FIELD

Embodiments of the present invention generally relate to multi-node network clusters, and more particularly to systems and methods for incident detection and/or recovery in multi-node network clusters.

BACKGROUND

Managing a local network includes a number of tasks that are specific to the local network. Such tasks specific to the local network are often best handled by a network administrator who is trained in administration of the local network and familiar with the local network. In contrast, the setup of an SD-WAN includes a number of requirements that are not specific to the local network, and as such require the network administrator of the local network to do research on what are often topics of first impression for them. Not only does this demand a great deal of the network administrator's time, it often results in errors in the setup. Further, local SD-WANs may be setup for a large number of locations, each with a separate administrator capable of making an error when performing the setup. As such, the potential for introducing errors in an overall SD-WAN setup can be considerable.

Thus, there exists a need in the art for more advanced approaches, devices and systems for setting up SD-WAN connections.

SUMMARY

Various embodiments provide systems and methods for automating an SD-WAN setup process.

This summary provides only a general outline of some embodiments. Many other objects, features, advantages and other embodiments will become more fully apparent from the following detailed description, the appended claims and the accompanying drawings and figures.

BRIEF DESCRIPTION OF THE DRAWINGS

A further understanding of the various embodiments may be realized by reference to the figures which are described in remaining portions of the specification. In the figures, similar reference numerals are used throughout several drawings to refer to similar components. In some instances, a sub-label consisting of a lower-case letter is associated with a reference numeral to denote one of multiple similar components. When reference is made to a reference numeral without specification to an existing sub-label, it is intended to refer to all such multiple similar components.

DETAILED DESCRIPTION

Figure 1A:
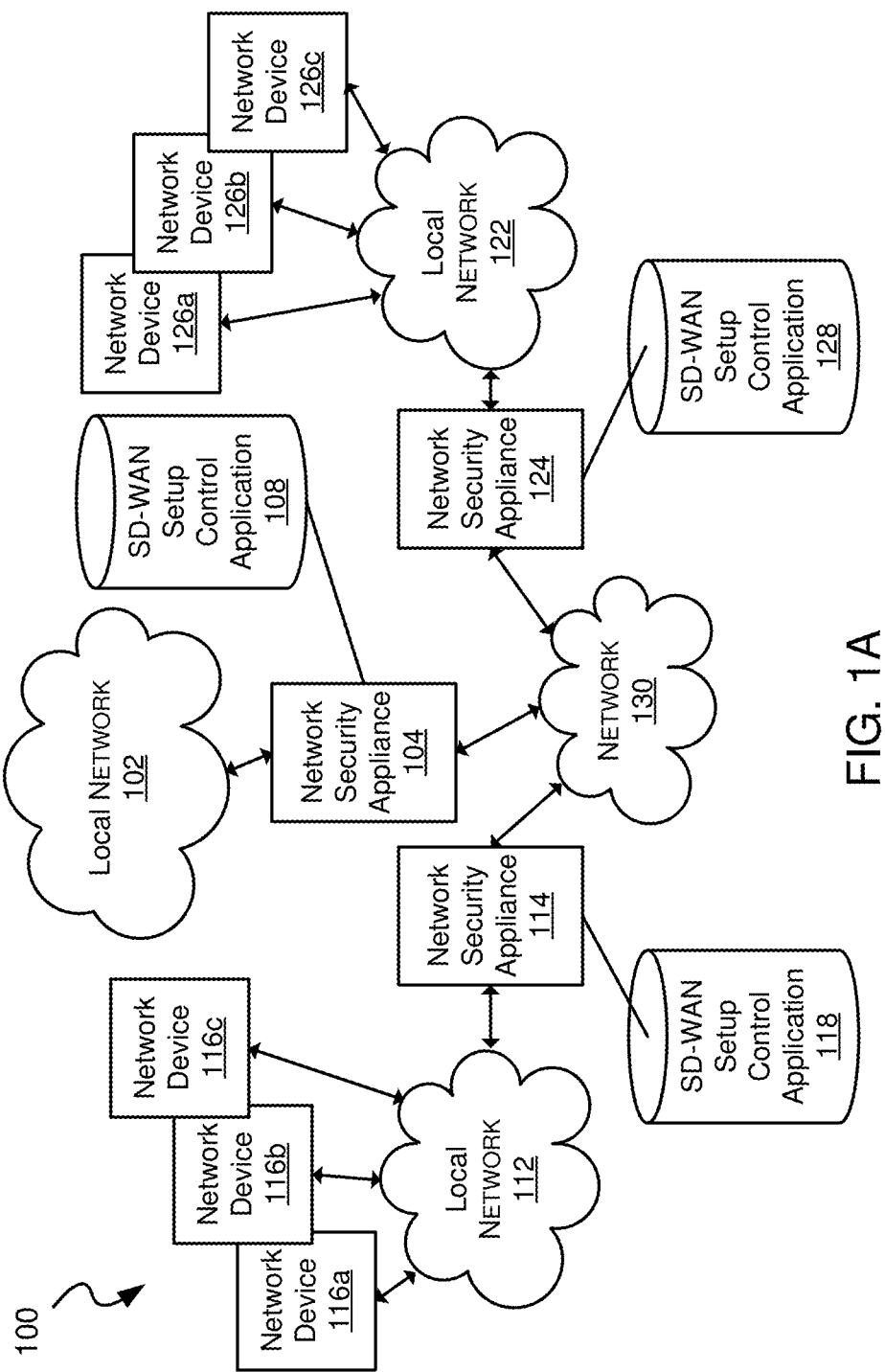
FIGS. 1A-1C illustrate a network architecture including an SD-WAN setup control application supporting semi-automated SD-WAN setup in accordance with some embodiments.

Various embodiments provide systems and methods for automating an SD-WAN setup process.

Embodiments of the present disclosure include various processes, which will be described below. The processes may be performed by hardware components or may be embodied in machine-executable instructions, which may be used to cause a general-purpose or special-purpose processor programmed with the instructions to perform the steps. Alternatively, processes may be performed by a combination of hardware, software, firmware and/or by human operators.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

Terminology

Brief definitions of terms used throughout this application are given below.

The terms "connected" or "coupled" and related terms, unless clearly stated to the contrary, are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

As used herein, a "network appliance", a "network element", or a "network device" generally refers to a device or appliance in virtual or physical form that is operable to perform one or more network functions. In some cases, a network appliance may be a database, a network server, user device, or the like. Some network devices may be implemented as general-purpose computers or servers with appropriate software operable to perform the one or more network functions. Other network devices may also include custom hardware (e.g., one or more custom Application-Specific Integrated Circuits (ASICs)). Based upon the disclosure provided herein, one of ordinary skill in the art will recognize a variety of network appliances that may be used in relation to different embodiments. In some cases, a network appliance may be a "network security appliance" or a "network security device" that may reside within the particular network that it is protecting, or network security may be provided as a service with the network security device residing in the cloud. For example, while there are differences among network security device vendors, network security devices may be classified in three general performance categories, including entry-level, mid-range, and high-end network security devices. Each category may use different types and forms of central processing units (CPUs), network processors (NPs), and content processors (CPs). NPs may be used to accelerate traffic by offloading network traffic from the main processor. CPs may be used for security functions, such as flow-based inspection and encryption. Entry-level network security devices may include a CPU and no co-processors or a system-on-a-chip (SoC) processor that combines a CPU, a CP and an NP. Mid-range network security devices may include a multi-core CPU, a separate NP Application-Specific Integrated Circuits (ASIC), and a separate CP ASIC. At the high-end, network security devices may have multiple NPs and/or multiple CPs. A network security device is typically associated with a particular network (e.g., a private enterprise network) on behalf of which it provides the one or more security functions. Non-limiting examples of security functions include authentication, next-generation firewall protection, antivirus scanning, content filtering, data privacy protection, web filtering, network traffic inspection (e.g., secure sockets layer (SSL) or Transport Layer Security (TLS) inspection), intrusion prevention, intrusion detection, denial of service attack (DoS) detection and mitigation, encryption (e.g., Internet Protocol Secure (IPSec), TLS, SSL), application control, Voice over Internet Protocol (VoIP) support, Virtual Private Networking (VPN), data leak prevention (DLP), antispam, antispyware, logging, reputation-based protections, event correlation, network access control, vulnerability management, and the like. Such security functions may be deployed individually as part of a point solution or in various combinations in the form of a unified threat management (UTM) solution. Non-limiting examples of network security appliances/devices include network gateways, VPN appliances/gateways, UTM appliances (e.g., the FORTIGATE family of network security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), network access control appliances (e.g., FORTINAC family of network access control appliances), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), virtual or physical sandboxing appliances (e.g., FORTISANDBOX family of security appliances), and DoS attack detection appliances (e.g., the FORTIDDOS family of DoS attack detection and mitigation appliances).

As used herein, the phrases "network path", "communication path", or "network communication path" generally refer to a path whereby information may be sent from one end and received on the other. In some embodiments, such paths are referred to commonly as tunnels which are configured and provisioned as is known in the art. Such paths may traverse, but are not limited to traversing, wired or wireless communication links, wide area network (WAN) communication links, local area network (LAN) communication links, and/or combinations of the aforementioned. Based upon the disclosure provided herein, one of ordinary skill in the art will recognize a variety of communication paths and/or combinations of communication paths that may be used in relation to different embodiments.

The phrase "processing resource" is used in its broadest sense to mean one or more processors capable of executing instructions. Such processors may be distributed within a network environment or may be co-located within a single network appliance. Based upon the disclosure provided herein, one of ordinary skill in the art will recognize a variety of processing resources that may be used in relation to different embodiments.

The phrase "SD-WAN" is used in its broadest sense to mean a software defined wide area network.

Some embodiments provide methods for semi-automated SD-WAN setup for a local network that include: receiving, by a processing resource, a local network specific SD-WAN setup parameter; requesting, by the processing resource, a general SD-WAN setup parameter from a network device outside of the local network; receiving, by the processing resource, the general SD-WAN setup parameter; and automatically setting up, by the processing resource, an SD-WAN connection for the local network using a combination of the local network specific SD-WAN setup parameter and the general SD-WAN setup parameter. In some instances of the aforementioned embodiment, the processing resource is incorporated in a network security appliance guarding access to the local network. In various instances, the methods further include displaying, by the processing resource, an SD-WAN connection status.

In some instances of the aforementioned embodiments, the methods further include displaying, by the processing resource, a browser-based interface, wherein the browser-based interface includes a query for the local network specific SD-WAN setup parameter. In such instances, the local network specific SD-WAN setup parameter is received via the browser-based interface. In various instances of the aforementioned embodiments the local network specific SD-WAN setup parameter is one or both of an identifier of the local network, and/or a public Internet Protocol (IP) address.

In various instances of the aforementioned embodiments where the network device is a first network device and the processing resource is incorporated in a second network device, the method further includes identifying, by the processing resource, the first network device based at least in part upon its inclusion in a network security fabric with the second network device. In some such instances, identifying the first network device is further based at least in part upon the first network device having an existing SD-WAN connection.

In some instances of the aforementioned embodiments where the network device is a first network device and the processing resource is incorporated in a second network device, the method further includes identifying, by the processing resource, the first network device based at least in part on the first network device being accessible to the second network device. In some such instances, identifying the first network device is further based at least in part upon the first network device having an existing SD-WAN connection.

In various instances of the aforementioned embodiments, the methods further include: determining, by the processing resource, that the general SD-WAN parameter is not available from the network device; displaying, by the processing resource, a browser-based interface. In such instances, the browser-based interface includes a query for the general SD-WAN setup parameter; and the receiving the general SD-WAN setup parameter is done via the browser-based interface.

Other embodiments provide systems for semi-automated SD-WAN setup for a local network. The systems include a processing resource and a non-transient computer readable medium coupled to the processing resource. The non-transient computer readable medium has stored therein instructions that when executed by the processing resource cause the processing resource to: receive a local network specific SD-WAN setup parameter; request a general SD-WAN setup parameter from a network device outside of the local network; receive the general SD-WAN setup parameter; and automatically setup an SD-WAN connection for the local network using a combination of the local network specific SD-WAN setup parameter and the general SD-WAN setup parameter.

Yet other embodiments provide non-transient computer readable media having stored therein instructions that when executed by a processing resource cause the processing resource to: receive a local network specific SD-WAN setup parameter; request a general SD-WAN setup parameter from a network device outside of the local network; receive the general SD-WAN setup parameter; and automatically setup an SD-WAN connection for the local network using a combination of the local network specific SD-WAN setup parameter and the general SD-WAN setup parameter.

Turning to FIG. 1A, a network architecture 100 is shown that includes a number of SD-WAN setup control applications 108, 118, 128. Such SD-WAN setup control applications 108, 118, 128 facilitate semi-automated SD-WAN setup in accordance with some embodiments. As shown, network architecture 100 includes a local network 102, a local network 112, and a local network 122. Local networks 102, 112, 122 may be any local network including, but not limited to, a corporate network. Local networks 102, 112, 122 may be any type of networks or combination of networks. Any or all of local networks 102, 112, 122 can be: a wireless network, a wired network or a combination thereof that can be implemented as one of the various types of networks, such as an Intranet, a Local Area Network (LAN), a Wide Area Network (WAN), an Internet, and/or the like. Further, any or all of local networks 102, 112, 122 can either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like. Based upon the disclosure provided herein, one of ordinary skill in the art will recognize a variety of network types, network combinations, and/or connections that may be included as part of any or all of local networks 102, 112, 122. Local networks 102, 112, 122 may include a number of network devices connected to the particular network. For example, network devices 116a, 116b, 116c are shown as connected to local network 112, and network devices 126a, 126b, 126c are shown as connected to local network 122.

Access to local network 102 is controlled by a network security appliance 104 that may provide a number of security features as are known in the art. Further network security appliance 104 is communicably coupled to SD-WAN setup control application 108 that provides one or both of: (1) general SD-WAN setup parameters to other network security appliances, and/or semi-automated SD-WAN connection setup for local network 102. Access to local network 112 is controlled by a network security appliance 114 that may provide a number of security features as are known in the art. Further network security appliance 114 is communicably coupled to SD-WAN setup control application 118 that provides one or both of: (1) general SD-WAN setup parameters to other network security appliances, and/or semi-automated SD-WAN connection setup for local network 112. Access to local network 122 is controlled by a network security appliance 124 that may provide a number of security features as are known in the art. Further network security appliance 124 is communicably coupled to SD-WAN setup control application 128 that provides one or both of: (1) general SD-WAN setup parameters to other network security appliances, and/or semi-automated SD-WAN connection setup for local network 122.

A network 130 facilitates communications between respective network security appliances 104, 114, 124. Network 130 may be any type of network or combination of networks. For example, network 130 may be, but is not limited to, a wireless network, a wired network, or a combination of a wired and wireless network that can be implemented as one of the various types of networks, such as an Intranet, a Local Area Network (LAN), a Wide Area Network (WAN), an Internet, and/or the like. Network 130 can either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like. Based upon the disclosure provided herein, one of ordinary skill in the art will recognize a variety of network types, network combinations, and/or connections that may be included as part of any or all of network 130. Network 130 may connect other devices beyond the three network security appliances that are shown.

In some embodiments SD-WAN setup using one or more of SD-WAN setup control applications 108, 118, 128 may be done consistent with that discussed below in relation to FIG. 2 where general SD-WAN setup parameters may be obtained from any network device that already has an SD-WAN setup and which the network device attempting the SD-WAN setup has access. In other embodiments SD-WAN setup using one or more of SD-WAN setup control applications 108, 118, 128 may be done consistent with that discussed below in relation to FIG. 5 where general SD-WAN setup parameters are obtained from one designated source for the general SD-WAN parameters. Based upon the disclosure provided herein, one of ordinary skill in the art will recognize other approaches for performing SD-WAN setup for network devices on network architecture 100 that may be used in relation to different embodiments.

Figure 1B:
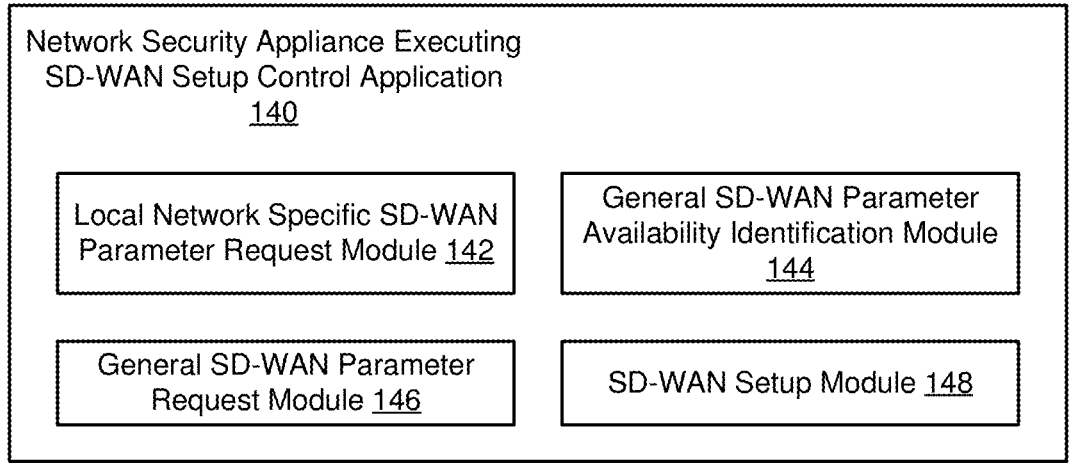

Turning to FIG. 1B, a network security appliance executing an SD-WAN setup control application 140 (e.g., network security appliance 104 executing SD-WAN setup control application 108) is shown in accordance with some embodiments. As shown, network security appliance executing an SD-WAN setup control application 140 includes a local network specific SD-WAN parameter request module 142, a general SD-WAN parameter availability identification module 144, a general SD-WAN parameter request module 146, and an SD-WAN setup module 148.

Local network specific SD-WAN parameter request module 142 is configured to request local network specific information from a user attempting to setup an SD-WAN connection. This may include, but is not limited to, presenting a browser-based graphical user interface that includes user fillable regions for the requested information. Such a browser-based graphical user interface may be similar to those discussed below in relation to FIGS. 3-4. Such local network specific SD-WAN setup parameters include any information relevant to the SD-WAN setup that is specific to the local network for which the SD-WAN is being setup. As some examples, the local network specific SD-WAN setup parameters include identifying the local network and the public Internet Protocol (IP) address. Based upon the disclosure provided herein, one of ordinary skill in the art will recognize a variety of local network specific SD-WAN setup parameters that may be requested and received in relation to different embodiments.

General SD-WAN parameter availability identification module 144 is configured to identify a network device accessible to the network device for which an SD-WAN is being setup that has already setup an SD-WAN connection and thus has the general SD-WAN setup parameters. In some embodiments, this may be done similar to that discussed below in relation to FIG. 2 where the general SD-WAN setup parameters can be obtained from any network device that already has an SD-WAN setup and which the network device attempting the SD-WAN setup has access. In other embodiments, this may be done similar to that discussed below in relation to FIG. 5 where general SD-WAN setup parameters are obtained from one designated source for the general SD-WAN parameters.

General SD-WAN parameter request module 146 is configured to request the general SD-WAN setup parameters from an identified network device. This may include, but is not limited to, issuing a query via a communication network to the identified network device requesting the parameters, and subsequently receiving a response to the query. SD-WAN setup module 148 is configured to setup the SD-WAN using a combination of the local network specific SD-WAN setup parameters and the general SD-WAN setup parameters.

Figure 1C:
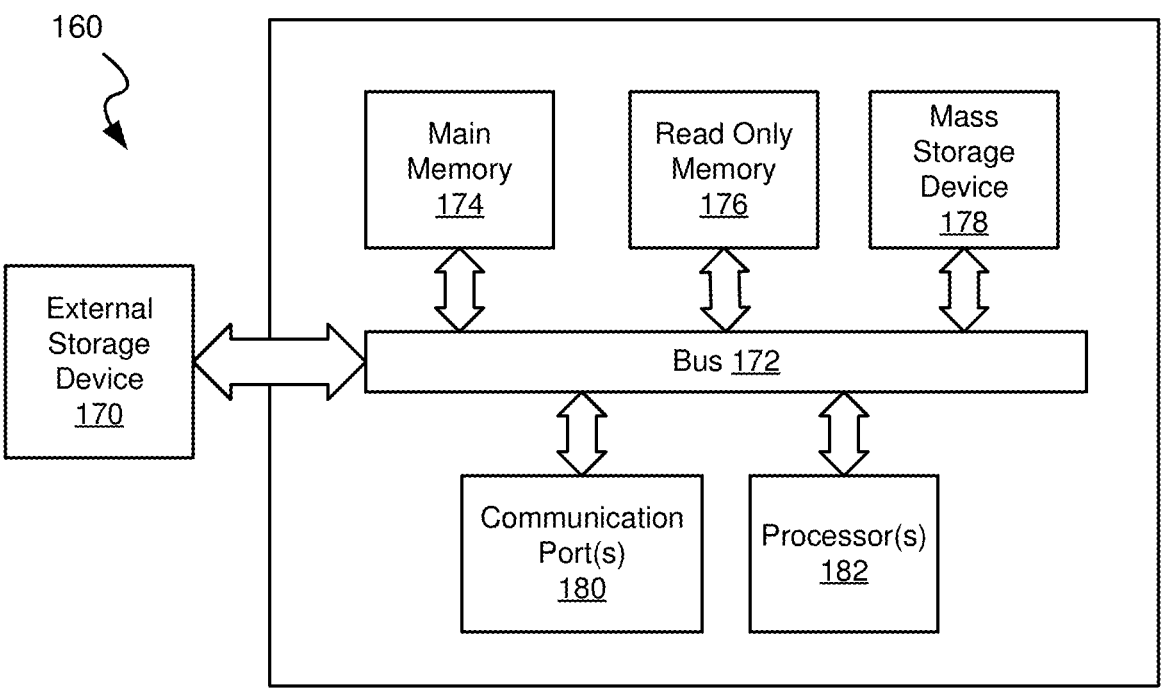

Turning to FIG. 1C, an example computer system 160 in which or with which embodiments of the present invention may be utilized is shown. In some case, one or more of network security appliances 104, 114, 124, and/or network devices 116, 126 may be implemented to include the features of example computer system 160. As shown in FIG. 1C, computer system 160 includes an external storage device 170, a bus 172, a main memory 174, a read-only memory 176, a mass storage device 178, a communication port 180, and one or more processors 182.

Those skilled in the art will appreciate that computer system 160 may include more than one processor 182 and communication ports 180. Examples of processor 1820 include, but are not limited to, an Intel® Itanium® or Itanium 2 processor(s), or AMD® Opteron® or Athlon MP® processor(s), Motorola® lines of processors, FortiSOC™ system on chip processors or other future processors. Processor 182 may include various modules associated with embodiments of the present invention.

Communication port 180 can be any of an RS-232 port for use with a modem-based dialup connection, a 10/100 Ethernet port, a Gigabit or 10 Gigabit port using copper or fiber, a serial port, a parallel port, or other existing or future ports. Communication port 180 may be chosen depending on a network, such as a Local Area Network (LAN), Wide Area Network (WAN), or any network to which the computer system connects.

Memory 174 can be Random Access Memory (RAM), or any other dynamic storage device commonly known in the art. Read-Only Memory 176 can be any static storage device(s) e.g., but not limited to, a Programmable Read-Only Memory (PROM) chips for storing static information e.g. start-up or BIOS instructions for processor 182.

Mass storage 178 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 172 communicatively couples processor(s) 182 with the other memory, storage, and communication blocks. Bus 172 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 182 to a software system.

Optionally, operator and administrative interfaces, e.g. a display, keyboard, and a cursor control device, may also be coupled to bus 172 to support direct operator interaction with the computer system. Other operator and administrative interfaces can be provided through network connections connected through communication port 180. An external storage device 170 can be any kind of external hard-drives, floppy drives, IOMEGA® Zip Drives, Compact Disc-Read-Only Memory (CD-ROM), Compact Disc-Re-Writable (CD-RW), Digital Video Disk-Read Only Memory (DVD-ROM). The components described above are meant only to exemplify various possibilities. In no way should the aforementioned example computer system limit the scope of the present disclosure.

Figure 2:
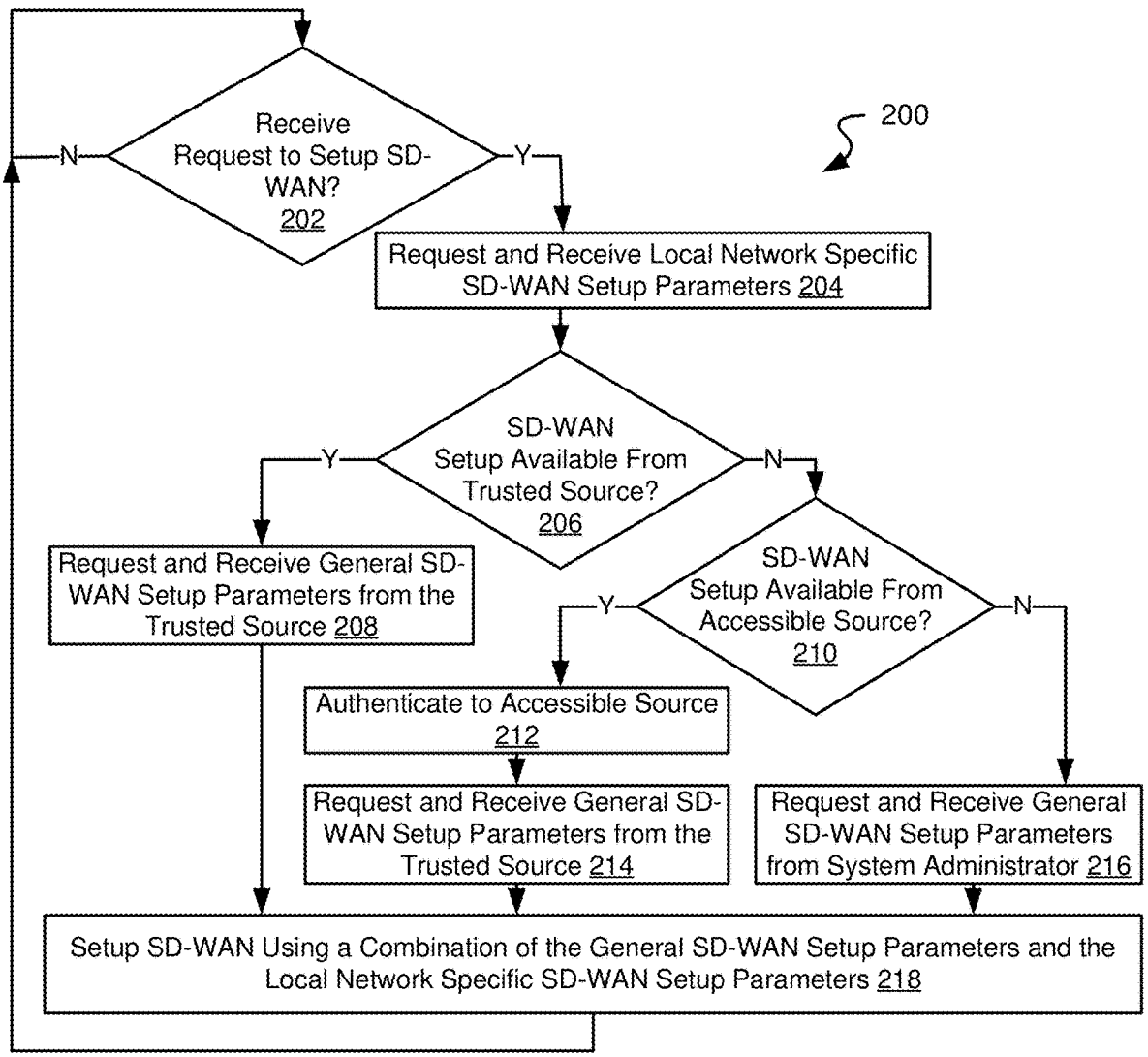
FIG. 2 is a flow diagram showing a method in accordance with some embodiments for semi-automated SD-WAN setup.

Turning to FIG. 2, a flow diagram 200 shows a method in accordance with some embodiments for semi-automated SD-WAN setup. Following flow diagram 200, it is determined whether a request to setup an SD-WAN has been received (block 202). Receipt of a request to setup an SD-WAN may be, for example, caused by a system administrator accessing an SD-WAN setup wizard. In some embodiments, initiating such an SD-WAN wizard begins execution of an SD-WAN setup control application by a network security appliance. Based upon the disclosure provided herein, one of ordinary skill in the art will recognize a variety of approaches that may be used in relation to different embodiments to initiate an SD-WAN setup and cause the aforementioned receipt of the request to setup an SD-WAN.

Upon receiving a request to setup an SD-WAN (block 202), a query is provided requesting various local network specific SD-WAN setup parameters, and a response to that query is received (block 204). Such local network specific SD-WAN setup parameters include any information relevant to the SD-WAN setup that is specific to the local network for which the SD-WAN is being setup. As some examples, the local network specific SD-WAN setup parameters include identifying the local network and the public Internet Protocol (IP) address. Based upon the disclosure provided herein, one of ordinary skill in the art will recognize a variety of local network specific SD-WAN setup parameters that may be requested and received in relation to different embodiments.

It is determined whether an SD-WAN setup is available from a trusted source (block 206). It may be that the network security appliance involved in setting up the SD-WAN is part of a security fabric. Such a security fabric may be similar to that disclosed in U.S. Pat. No. 11,019,029 entitled "Building a cooperative security fabric of hierarchically interconnected network security devices" and issued May 25, 2021 to Xie et al. The entirety of the aforementioned reference is incorporated herein by reference for all purposes. In such a security fabric the various nodes (e.g., network security appliances) are known to each other and include an inter-node communication process. In such a case, the various nodes would be considered trusted sources and any node within the security fabric with which the network security appliance involved in setting up the SD-WAN can communicate would provide an acceptable node from which to obtain SD-WAN setup parameters. As another example that may be used in either security fabric scenario or a non-security fabric scenario, a master node may be designated as the only trusted source Where it is determined that an SD-WAN setup is available from a trusted source (block 206), general SD-WAN setup parameters are requested and received from the identified trusted source (block 208). Such general SD-WAN setup parameters are parameters used in setting up the SD-WAN that are relevant to more than just the local network for which the setup request is received. By propagating general SD-WAN setup parameters from a trusted source rather than requiring a local network administrator to identify the general SD-WAN setup parameters, errors in SD-WAN setup are avoided. Further, such propagation allows a network administrator trained in SD-WAN setup to effectively setup SD-WANs for a number of local networks without actually engaging with such local networks.

Alternatively, it is determined that an SD-WAN setup is available from an accessible source (block 210). An accessible source requires some level of authentication and/or authorization beyond that required for a trusted source. Thus, for example, where the network security appliance involved in setting up the SD-WAN has access to another network device, but must first authenticate to that network device, such a network device is considered an accessible network source. Determining that such an SD-WAN setup is available from an accessible source (block 210) may include, but is not limited to, providing such information to a local network administrator. Based upon the disclosure provided herein, one of ordinary skill in the art will recognize a variety of accessible sources, and approaches for determining that particular information is or may be available from such an accessible source.

Where it is determined that an SD-WAN setup is available from an accessible source (block 210), the network security appliance involved in setting up the SD-WAN authenticates itself to the accessible source (or otherwise gains sufficient access to the accessible source to gain access to general SD-WAN setup parameters) (block 212). The general SD-WAN setup parameters are requested and received from the identified accessible source (block 214).

Otherwise, where neither a trusted source (block 206) nor an accessible source (block 210) is identified, a request is provided to the local system administrator for them to enter the general SD-WAN setup parameters (block 216). In such a case, the local system administrator would not have to determine all of the parameters required to setup the requested SD-WAN connection.

Once the general SD-WAN setup parameters are available (from one of a trusted source (block 208), an accessible source (block 214), or from the local system administrator (block 216)), the network security appliance involved in setting up the SD-WAN sets up the SD-WAN using a combination of the local network specific SD-WAN setup parameters and the general SD-WAN setup parameters (block 218).

Figure 3:
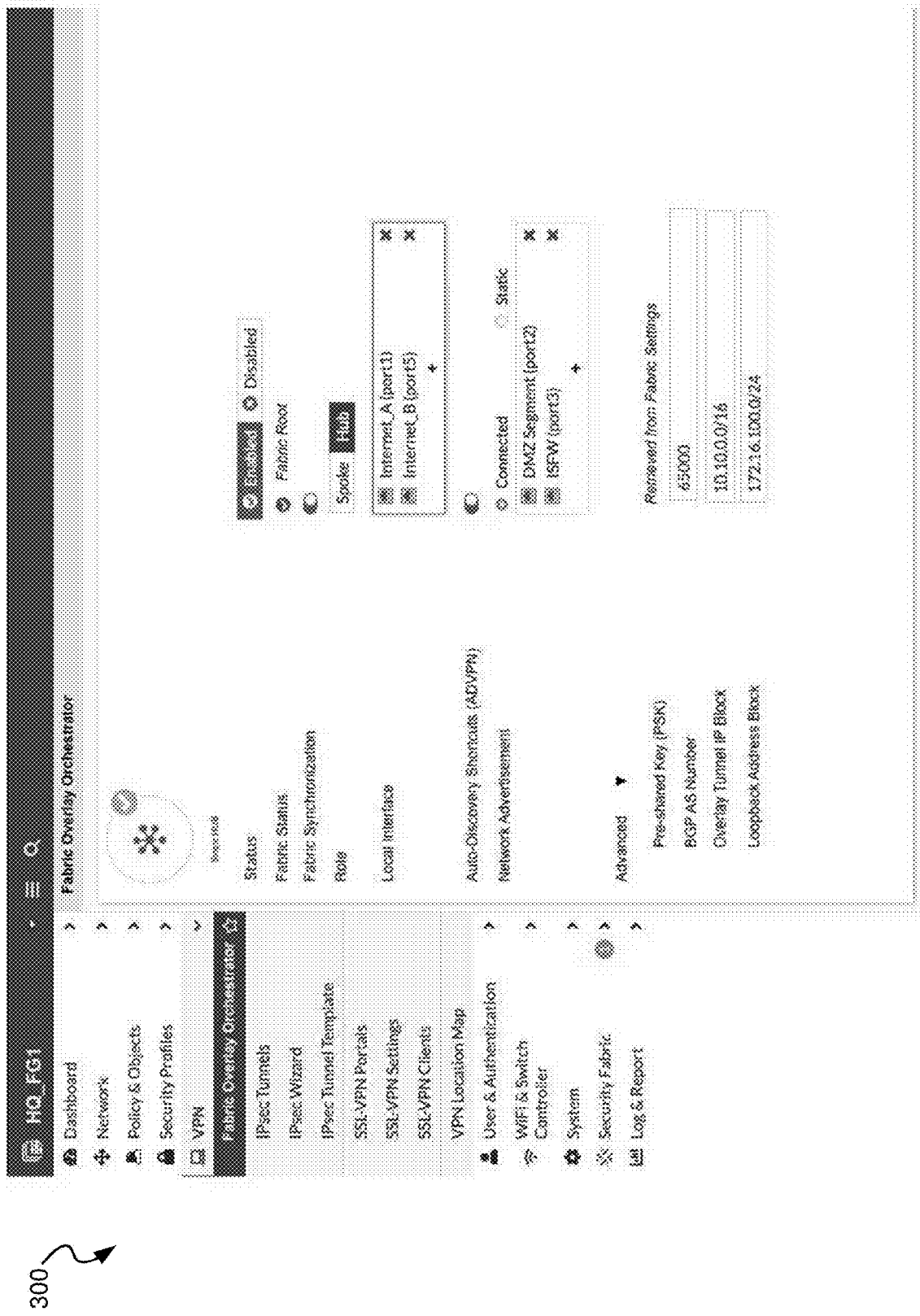
FIG. 3 is a screenshot of a browser-based graphical user interface of a network security appliance for creating an SD-WAN setup that may be used in relation to one or more embodiments discussed herein.

Turning to FIG. 3, a screenshot of an example browser-based graphical user interface 300 of a network security appliance is shown that may be used in relation to one or more embodiments discussed herein. Browser-based graphical user interface 300 provides an ability for a user to enable an orchestrator and to choose the role of the local network (i.e., either hub or spoke). A hub would be the role of providing general SD-WAN setup parameters to other networks, and a spoke would be the role of receiving general SD-WAN setup parameters from a hub. This is used in the case where a single source is designated for provide the general SD-WAN setup parameters. Based upon the disclosure provided herein, one of ordinary skill in the art will recognize a variety of other browser-based graphical user interfaces that may be used in relation to different embodiments.

Figure 4:
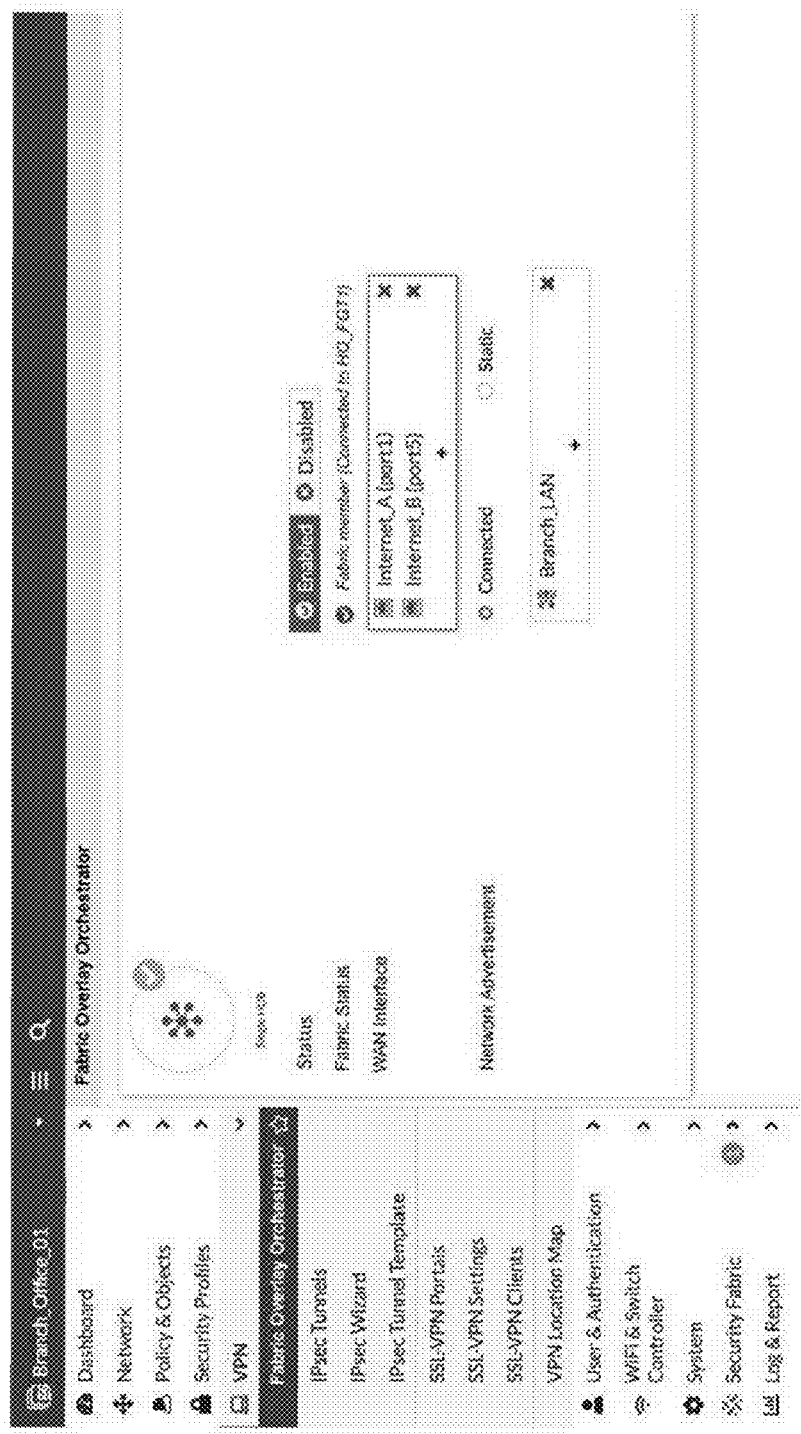
FIG. 4 is a screenshot of another browser-based graphical user interface of a network security appliance for creating an SD-WAN setup that may be used in relation to one or more embodiments discussed herein.

Turning to FIG. 4, a screenshot of another example browser-based graphical user interface 400 of a network security appliance is shown that may be used in relation to one or more embodiments discussed herein. Browser-based graphical user interface 400 that would be displayed after browser-based graphical user interface 300, and provides for selection configuration elements to be used and/or shared in a semi-automated SD-WAN setup parameter. Based upon the disclosure provided herein, one of ordinary skill in the art will recognize a variety of other browser-based graphical user interfaces that may be used in relation to different embodiments.

Figure 5:
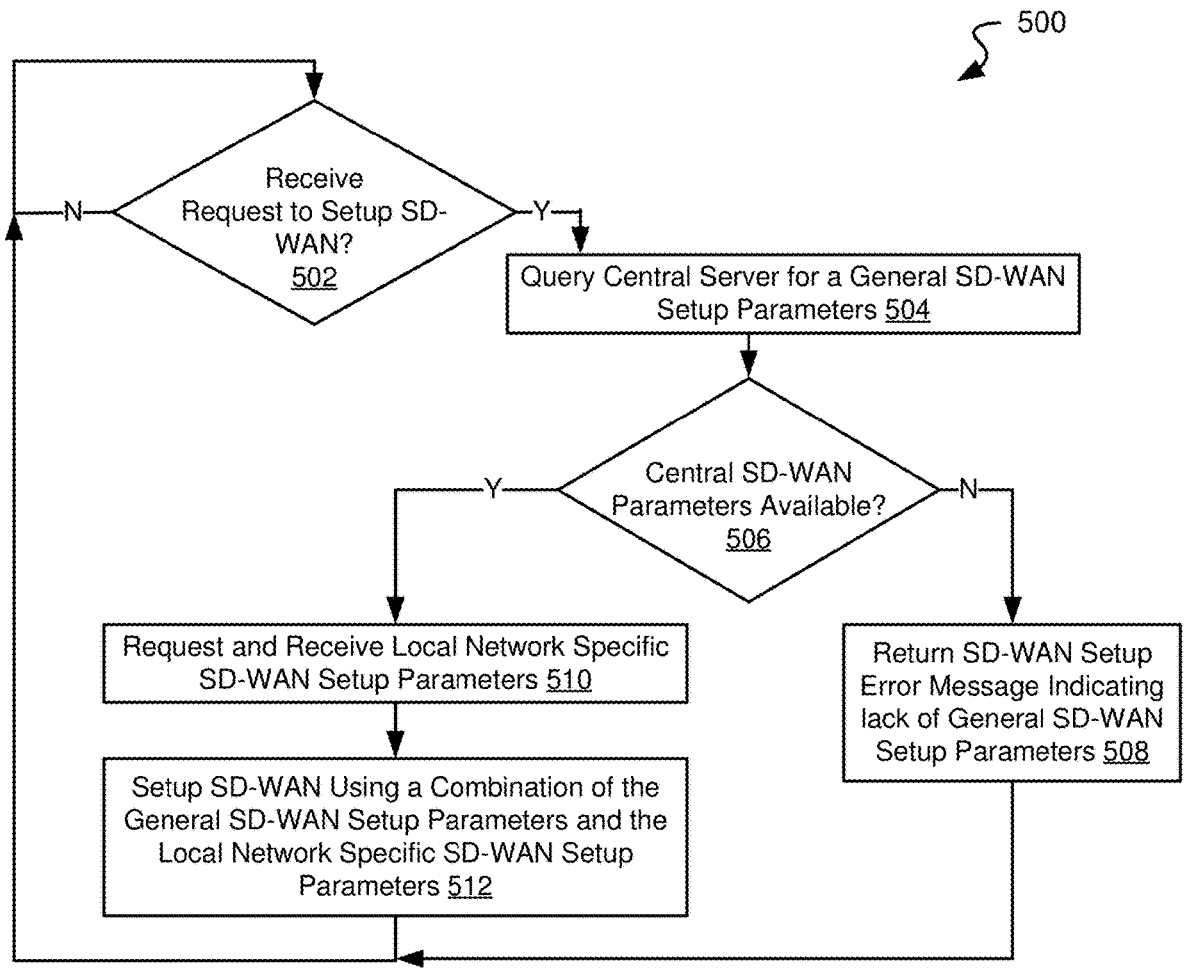
FIG. 5 is a flow diagram showing another method in accordance with some embodiments for semi-automated SD-WAN setup relying upon a central SD-WAN setup.

Turning to FIG. 5, a flow diagram 500 shows another method in accordance with some embodiments for semi-automated SD-WAN setup relying upon a central SD-WAN setup. In such a method, only a designated central source (e.g., a central server or designated network security appliance) is allowed to provide general SD-WAN setup parameters. This is in contrast to the method of FIG. 3 where the general SD-WAN parameters can be obtained from any trusted or accessible source. Following flow diagram 500, it is determined whether a request to setup an SD-WAN has been received (block 502). Receipt of a request to setup an SD-WAN may be, for example, caused by a system administrator accessing an SD-WAN setup wizard. In some embodiments, initiating such an SD-WAN wizard begins execution of an SD-WAN setup control application by a network security appliance. Based upon the disclosure provided herein, one of ordinary skill in the art will recognize a variety of approaches that may be used in relation to different embodiments to initiate an SD-WAN setup and cause the aforementioned receipt of the request to setup an SD-WAN.

Upon receiving a request to setup an SD-WAN (block 502), general SD-WAN setup parameters are requested from an identified central source (block 504). As set forth above, such general SD-WAN setup parameters are parameters used in setting up the SD-WAN that are relevant to more than just the local network for which the setup request is received. By propagating general SD-WAN setup parameters from only a central source rather than requiring a local network administrator to identify the general SD-WAN setup parameters, errors in SD-WAN setup are avoided. Further, such propagation allows a network administrator trained in SD-WAN setup to carefully setup SD-WAN parameters on the central source and thereby effectively setup SD-WANs for a number of local networks without actually engaging with such local networks.

It is determined whether the central source provided the requested SD-WAN setup parameters (block 506). Where the requested SD-WAN setup parameters were not received before a timeout period (block 506), a SD-WAN setup error message is returned indicating a lack of general SD-WAN setup parameters (block 508).

Alternatively, where the requested SD-WAN setup parameters are received before a timeout period (block 506), the local network administrator is queried for local network specific SD-WAN setup parameters, and a response is received (block 510). As discussed above, such local network specific SD-WAN setup parameters include any information relevant to the SD-WAN setup that is specific to the local network for which the SD-WAN is being setup. As some examples, the local network specific SD-WAN setup parameters include identifying the local network and the public Internet Protocol (IP) address. Based upon the disclosure provided herein, one of ordinary skill in the art will recognize a variety of local network specific SD-WAN setup parameters that may be requested and received in relation to different embodiments.

Having received both the general SD-WAN parameters and the local network specific SD-WAN parameters, the network security appliance involved in setting up the SD-WAN sets up the SD-WAN using a combination of the local network specific SD-WAN setup parameters and the general SD-WAN setup parameters (block 512).

In conclusion, the present invention provides for novel systems, devices, and methods. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A method for semi-automated software-defined wide area network (SD-WAN) setup for a local network, the method comprising:
receiving, by a processing resource of a network security device guarding access to the local network and representing a spoke of an SD-WAN, a local network specific SD-WAN setup parameter;
determining, by the processing resource of the network security device, whether a general SD-WAN setup parameter is available from a trusted network source comprising a network device outside of the local network;
requesting, by the processing resource of the network security device, the general SD-WAN setup parameter from the trusted source, if available from the trusted network source;
receiving, by the processing resource of the network security device, the general SD-WAN setup parameter from the trusted network resource, if available;
determining, by the processing resource of the network security device, whether the general SD-WAN setup parameter is available from an accessible network source;
authenticating, by the processing resource of the network security device, the accessible network source;
receiving, by the processing resource of the network security device, the general SD-WAN parameter from the accessible network source; and
automatically setting up, by the processing resource of the network security device, an SD-WAN connection for the local network using a combination of the local network specific SD-WAN setup parameter and the general SD-WAN setup parameter obtained from either the trusted network source or the accessible network source.

2. The method of claim 1, the method further comprising:
displaying, by the processing resource, a browser-based interface, wherein the browser-based interface includes a query for the local network specific SD-WAN setup parameter; and wherein the local network specific SD-WAN setup parameter is received via the browser-based interface.

3. The method of claim 1, wherein the local network specific SD-WAN setup parameter is selected from a group consisting of: an identifier of the local network, and a public Internet Protocol (IP) address.

4. The method of claim 1, method further comprising:
identifying, by the processing resource, the network device based at least in part upon its inclusion in a network security fabric with the network security device.

5. The method of claim 4, wherein identifying the network device is further based at least in part upon the network device having an existing SD-WAN connection.

6. The method of claim 1, further comprising:
identifying, by the processing resource, the network device based at least in part on the network device being accessible to the network security device.

7. The method of claim 6, wherein the identifying the network device is further based at least in part upon the network device having an existing SD-WAN connection.

8. The method of claim 1, the method further comprising:
displaying, by the processing resource, an SD-WAN connection status.

9. The method of claim 1, the method further comprising:
determining, by the processing resource, that the general SD-WAN parameter is not available from the network device;
displaying, by the processing resource, a browser-based interface, wherein the browser-based interface includes a query for the general SD-WAN setup parameter; and
wherein the receiving the general SD-WAN setup parameter is done via the browser-based interface.

10. The method of claim 1, wherein the network device comprises a designated network security device, guarding access to another local network, or a central server.

11. A system for semi-automated software-defined wide area network (SD-WAN) setup for a local network, the system comprising:
a processing resource of a network security device guarding access to the local network and representing a spoke of an SD-WAN;
a non-transient computer readable medium coupled to the processing resource and having stored therein instructions that when executed by the processing resource cause the processing resource to:
receive a local network specific SD-WAN setup parameter;
determine whether a general SD-WAN setup parameter is available from a trusted source outside of the local network;
request the general SD-WAN setup parameter from the trusted network source, if available;
determining whether the general SD-WAN setup parameter is available from an accessible network source;
authenticating the accessible network source;
receiving the general SD-WAN setup parameter from a network device outside of the local network representing a hub of the SD-WAN;
receive the general SD-WAN setup parameter; and
automatically setup an SD-WAN connection for the local network using a combination of the local network specific SD-WAN setup parameter and the general SD-WAN setup parameter obtained from either the trusted network source or the accessible network source.

12. The system of claim 11, wherein the non-transient computer readable medium further has stored therein instructions that when executed by the processing resource cause the processing resource to:
display a browser-based interface, wherein the browser-based interface includes a query for the local network specific SD-WAN setup parameter; and
wherein the local network specific SD-WAN setup parameter is received via the browser-based interface.

13. The system of claim 11, wherein the local network specific SD-WAN setup parameter is selected from a group consisting of: an identifier of the local network, and a public Internet Protocol (IP) address.

14. The system of claim 11, wherein the non-transient computer readable medium further has stored therein instructions that when executed by the processing resource cause the processing resource to:
identify the network device based at least in part upon its inclusion in a network security fabric with the network security device.

15. The system of claim 14, wherein identifying the network device is further based at least in part upon the network device having an existing SD-WAN connection.

16. The system of claim 11, wherein the non-transient computer readable medium further has stored therein instructions that when executed by the processing resource cause the processing resource to:
identify the network device based at least in part on the network device being accessible to the network security device.

17. The system of claim 11, wherein the non-transient computer readable medium further has stored therein instructions that when executed by the processing resource cause the processing resource to:
determine that the general SD-WAN parameter is not available from the network device;
display browser-based interface, wherein the browser-based interface includes a query for the general SD-WAN setup parameter; and
wherein the receiving the general SD-WAN setup parameter is done via the browser-based interface.

18. The system of claim 11, wherein the network device comprises a designated network security device, guarding access to another local network, or a central server.

19. A non-transient computer readable medium having stored therein instructions that when executed by a processing resource of a network security device, guarding access to a local network and representing a spoke of a software-defined wide area network (SD-WAN), cause the processing resource to:
receive a local network specific SD-WAN setup parameter;
determine whether a general SD-WAN setup parameter is available from a trusted source outside of the local network;
request the general SD-WAN setup parameter from the trusted network source, if available;
determining whether the general SD-WAN setup parameter is available from an accessible network source;
authenticating the accessible network source;
receiving the general SD-WAN setup parameter from a network device outside of the local network representing a hub of the SD-WAN;
receive the general SD-WAN setup parameter; and
automatically setup an SD-WAN connection for the local network using a combination of the local network specific SD-WAN setup parameter and the general SD-WAN setup parameter obtained from either the trusted network source or the accessible network source.

20. The non-transient computer readable medium of claim 19, wherein the non-transient computer readable medium further has stored therein instructions that when executed by the processing resource cause the processing resource to:
  identify the network device based at least in part upon its inclusion in a network security fabric with the network security device.

* * * * *